(12) United States Patent
Fishburn

(10) Patent No.: US 9,353,516 B2
(45) Date of Patent: May 31, 2016

(54) ALL-SEASON NON-CONDENSING BUILDING INSULATION SYSTEM

(71) Applicant: John Philip Fishburn, Alexandria, VA (US)

(72) Inventor: John Philip Fishburn, Alexandria, VA (US)

( * ) Notice: Subject to any disclaimer, the term of this patent is extended or adjusted under 35 U.S.C. 154(b) by 0 days.

(21) Appl. No.: 14/331,201

(22) Filed: Jul. 14, 2014

(65) Prior Publication Data

US 2016/0010326 A1 Jan. 14, 2016

(51) Int. Cl.
| | | |
|---|---|---|
| *E04B 1/74* | (2006.01) | |
| *E04B 1/70* | (2006.01) | |
| *F24F 7/00* | (2006.01) | |
| *E04B 1/62* | (2006.01) | |
| *F24F 5/00* | (2006.01) | |

(52) U.S. Cl.
CPC .............. *E04B 1/7069* (2013.01); *E04B 1/625* (2013.01); *F24F 5/0075* (2013.01); *Y02B 30/92* (2013.01)

(58) Field of Classification Search
CPC ..... E04F 13/007; E04D 13/17; E04D 13/172; E04D 13/174; E04D 13/178; E04B 1/74; E04B 1/7069; E04B 1/7409; F24F 5/0075; F24F 5/0082; F24F 13/18; F24F 7/02; Y02B 30/92; Y10T 137/7891; Y10T 137/698
USPC .................. 52/302.1, 302.3, 195.5, 199, 408; 137/855, 350, 360; 454/141, 164, 165, 454/260, 354, 186–253, 328, 341–345
See application file for complete search history.

(56) References Cited

U.S. PATENT DOCUMENTS

| | | | | |
|---|---|---|---|---|
| 3,993,096 | A | | 11/1976 | Wilson |
| 4,207,865 | A | * | 6/1980 | Allen ............................ 126/617 |
| 4,295,415 | A | * | 10/1981 | Schneider, Jr. ............... 454/185 |
| 4,393,861 | A | * | 7/1983 | Beard et al. ................... 126/620 |
| 4,411,255 | A | * | 10/1983 | Lee ................................ 126/618 |
| 4,452,228 | A | * | 6/1984 | Meyer ........................... 126/563 |
| 4,557,081 | A | * | 12/1985 | Kelly ................................ 52/94 |
| 4,565,214 | A | | 1/1986 | Parman |
| 4,843,786 | A | * | 7/1989 | Walkinshaw et al. ......... 52/169.5 |
| 5,027,572 | A | * | 7/1991 | Purcell et al. ................ 52/309.9 |
| 5,194,038 | A | * | 3/1993 | Klomhaus et al. ............ 454/162 |
| 5,238,450 | A | * | 8/1993 | Rotter ........................... 454/260 |
| 5,761,864 | A | * | 6/1998 | Nonoshita ..................... 52/302.3 |
| 5,988,264 | A | * | 11/1999 | Goldsmith .................... 165/48.1 |
| 6,021,953 | A | * | 2/2000 | Swan .......................... 236/44 A |
| 6,210,266 | B1 | | 4/2001 | Barton |
| 6,319,115 | B1 | * | 11/2001 | Shingaki ....................... 454/186 |
| 6,793,713 | B2 | | 9/2004 | Kretsinger et al. |
| 7,247,090 | B2 | | 7/2007 | Vacek |
| 7,556,559 | B2 | * | 7/2009 | Rivera et al. .................. 454/162 |
| 8,464,715 | B2 | | 6/2013 | Flynn |

(Continued)

*Primary Examiner* — Joshua J Michener
*Assistant Examiner* — Kyle Walraed-Sullivan

(57) ABSTRACT

An exterior wall is kept free of moisture condensation in both heating and cooling seasons by four one-way valves that utilize pressure differentials of a chimney effect to ventilate the insulating cavity with air from the drier colder side, while maintaining a vapor barrier on the more humid warmer side.

2 Claims, 4 Drawing Sheets

(56) References Cited

U.S. PATENT DOCUMENTS

| | | |
|---|---|---|
| 2003/0046888 A1* | 3/2003 | Ryan .......................... 52/302.1 |
| 2003/0205129 A1 | 11/2003 | Kretsinger et al. |
| 2004/0211315 A1 | 10/2004 | Kretsinger et al. |
| 2007/0084139 A1 | 4/2007 | Stender |
| 2007/0094964 A1* | 5/2007 | Stender ....................... 52/302.1 |
| 2008/0182503 A1* | 7/2008 | Yurcak ......................... 454/270 |
| 2010/0229498 A1* | 9/2010 | Pollack ........................ 52/741.4 |
| 2010/0233460 A1 | 9/2010 | Pollack |
| 2010/0319275 A1* | 12/2010 | O'Leary ....................... 52/173.1 |
| 2011/0209426 A1* | 9/2011 | Pollack ........................ 52/302.1 |
| 2013/0008109 A1* | 1/2013 | Brown ................. E04B 1/7612<br>52/302.1 |
| 2014/0099877 A1* | 4/2014 | Gassman et al. ............. 454/366 |

\* cited by examiner

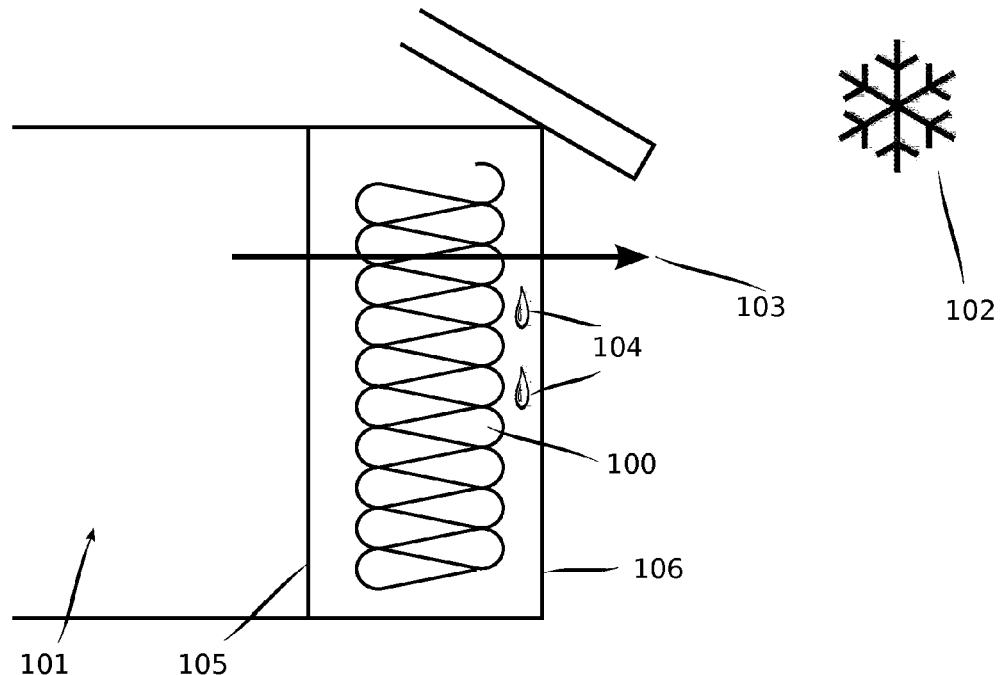
FIG. 1  - PRIOR ART -
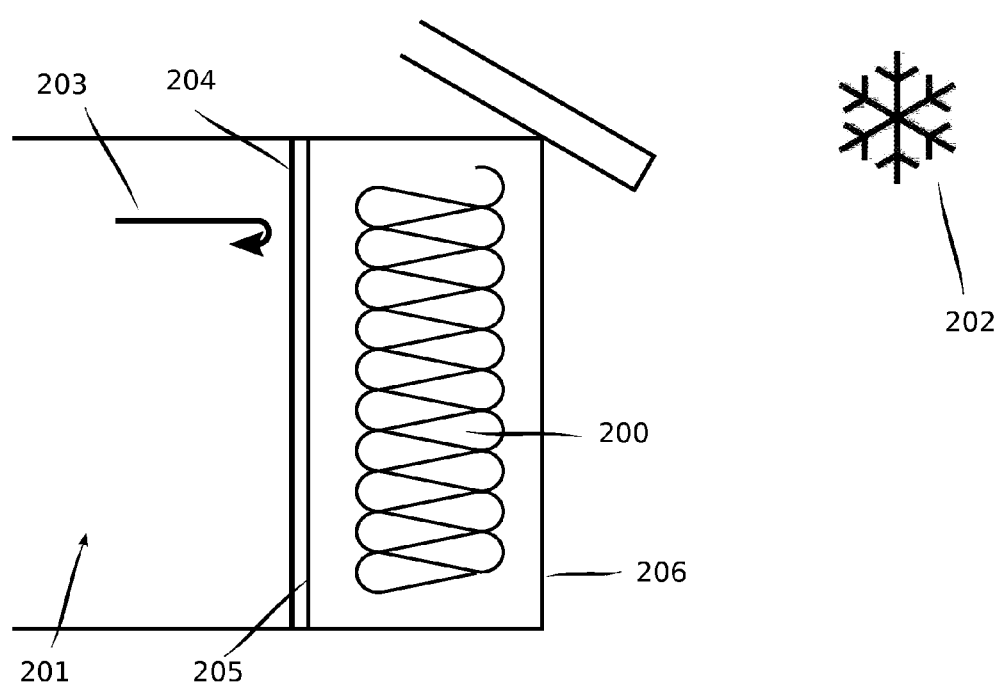
FIG. 2  - PRIOR ART -

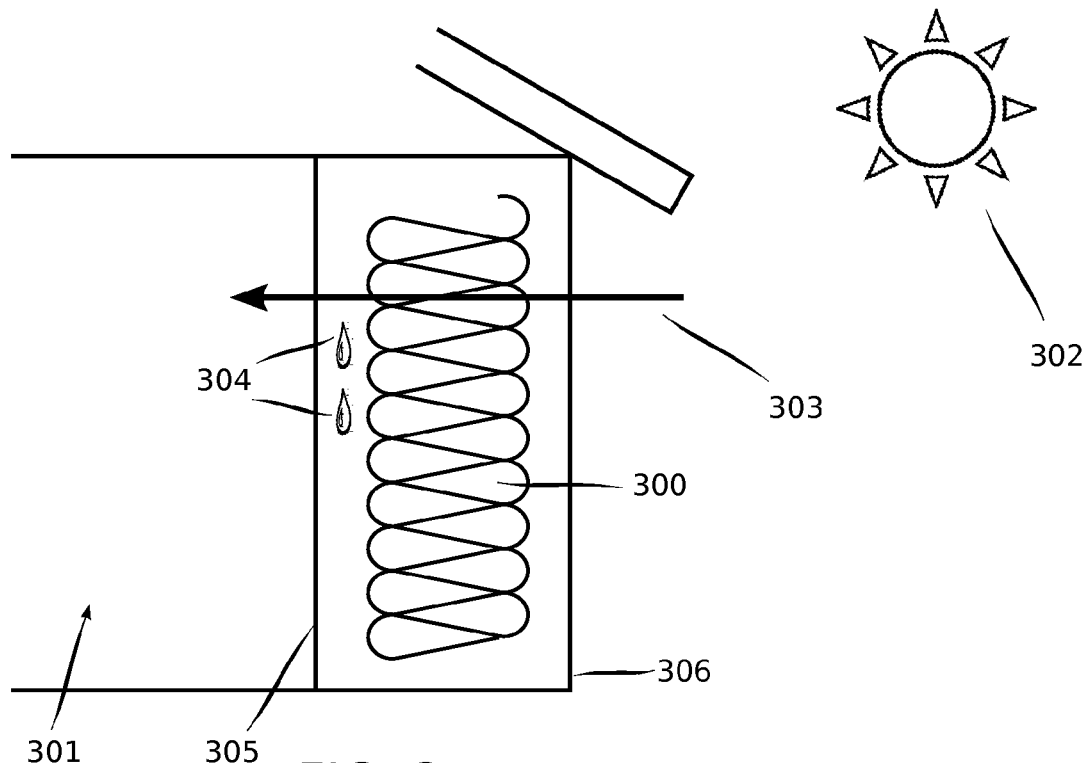
FIG. 3  - PRIOR ART -
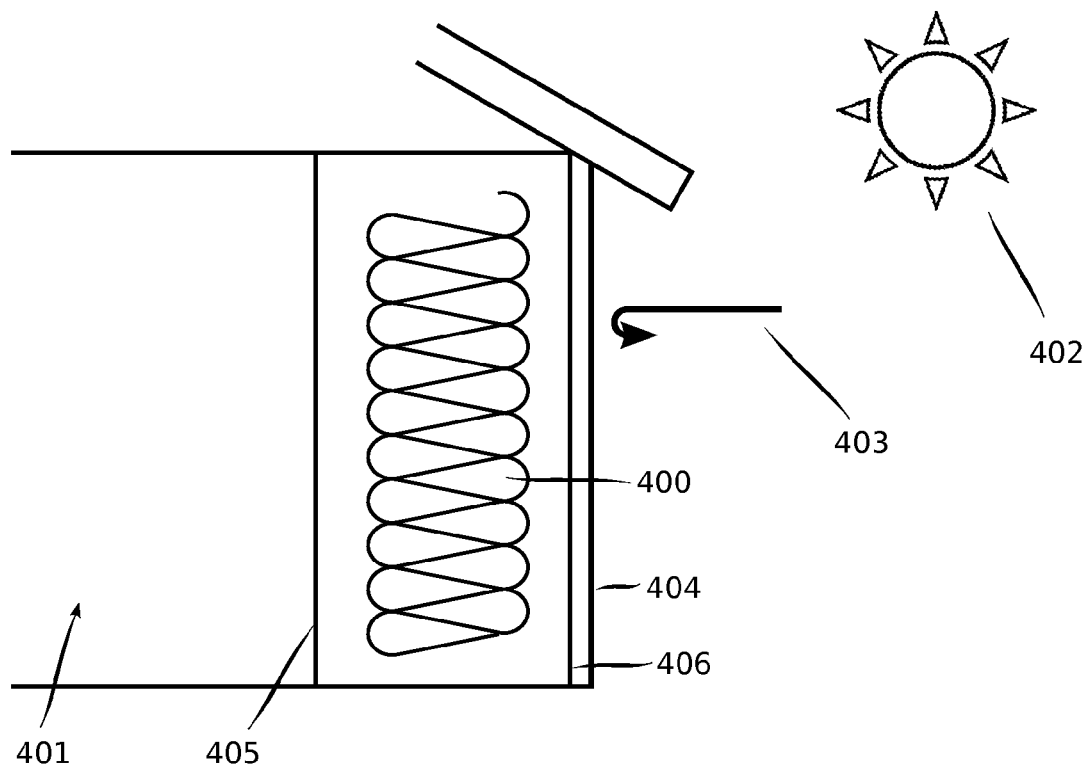
FIG. 4  - PRIOR ART -

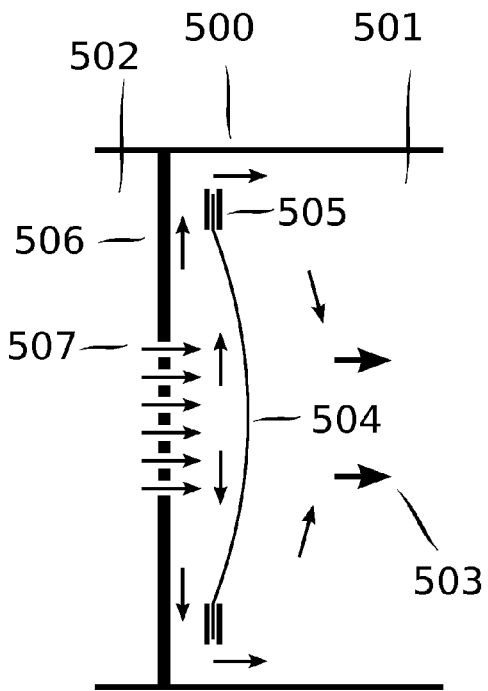
FIG. 5 - PRIOR ART -
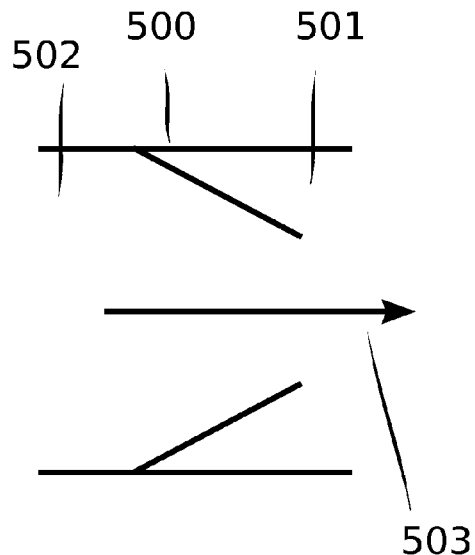
FIG. 6 - PRIOR ART -
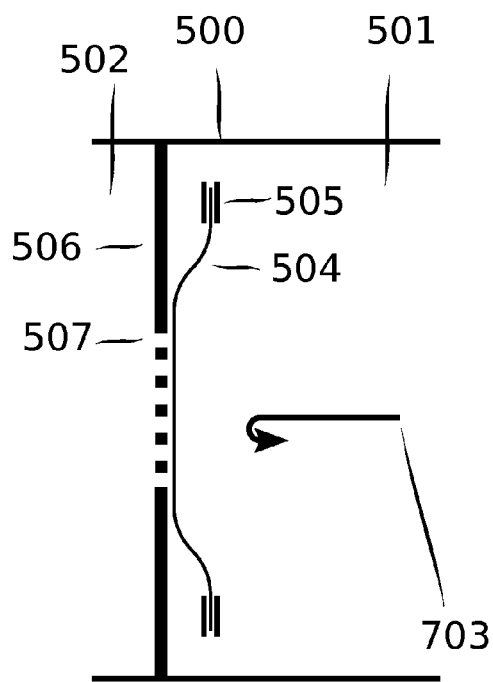
FIG. 7 - PRIOR ART -
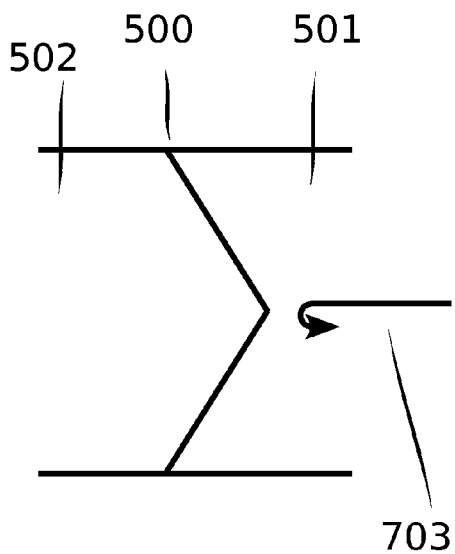
FIG. 8 - PRIOR ART -

ALL-SEASON NON-CONDENSING BUILDING INSULATION SYSTEM

BACKGROUND

Water is a building's worst enemy. Whether it comes from precipitation, groundwater, or condensation, water can, over time, cause mold and mildew, rotting of wood structures, corrosion of metals, separation of paint from surfaces, spalling of masonry and concrete, and health problems for building occupants. Moisture problems are a principal factor limiting the useful service life of a building.

Groundwater can be shunted away by drains and water barriers; buildings can be sheltered from rainwater by roofs and walls that shed water; but condensation is particularly insidious because it originates within the building itself.

Whenever a building is heated or cooled, a danger exists that moisture-laden air may travel from the warmer side of an exterior wall to the colder side, condensing when it reaches any surface colder than its dewpoint.

FIG. 1 illustrates the condensation problem in a heating season 102. Moisture may be added to the air 101 inside a building by various sources, such as tub baths and showers, respiration and perspiration of pets and humans, humidifiers, cooking, dishwashing, internal clothes dryer venting, floor mopping, houseplants, and gas range pilot lights. A chimney effect within the building may cause a chronic exfiltration of air 103 from the upper part of the structure, through cracks and other imperfections in the wall. A temperature gradient exists within the wall, from the warm inside wall 105 through the insulation 100 to the cold outside wall 106. When the airflow reaches a surface that is below the air's dewpoint, condensation 104 occurs. The condensation can continue over long periods of time, resulting in a significant accumulation of liquid water within the wall assembly.

FIG. 2 illustrates the basic method that has historically been used to combat winter condensation. The basic rule is, "Put a vapor barrier on the warm side of the wall." In FIG. 2, as in FIG. 1, a temperature gradient exists in winter 202 from the warm inside wall 205 through the insulation 200 to the cold outside wall 206. In FIG. 2, a vapor barrier 204 has been added, which prevents the humid inside air 203 from traveling into the wall. As a result the dewpoint of the air within the wall cavity is equal to the lower dewpoint of the dry outside air. Therefore no condensation occurs within the wall. Humid interior air 201 is in contact with the interior side of the vapor barrier, but the vapor barrier is warm because it is on the warm side of the wall. In particular, it is warmer than the dewpoint of the humid interior air, and so no condensation forms on the vapor barrier. The vapor barrier does not have to be perfect to be effective. It is sufficient if the vapor barrier is significantly less gas-permeable than the wall structures between the vapor barrier and the outside. When this requirement is met, the wall will dry to the outside, and so the dewpoint of the air within the wall cavity will be approximately the same as the dewpoint of the dry outside air. No condensation will form.

FIG. 3 depicts the problem for a building that is air-conditioned in a cooling season 302. The temperature gradient now runs in the opposite direction, from a warm outside wall 306 through the insulation 300 to a cold inside wall. Air 301 inside the building is dehumidified as well as cooled. A reverse chimney effect induces an infiltration 303 of warm humid air in the upper part of the structure, from the outside to the inside. When this air contacts materials colder than its dewpoint, condensation 304 accumulates.

FIG. 4 illustrates the basic method that is recommended for warm climates, to combat this condensation. Now the exterior temperature is higher, so the vapor barrier 404 is placed on the outside. The vapor barrier prevents high-dewpoint exterior air from traveling through the wall. As a result the dewpoint of the air within the wall is equal to the lower dewpoint of the dry inside air. Therefore no condensation occurs within the wall. Humid exterior air 403 is in contact with the vapor barrier 404, but does not condense because the vapor barrier is on the warmer side of the wall, and is at a higher temperature than the dewpoint of the outside air. Again, the vapor barrier does not have to be perfect, only significantly less gas-permeable than the structures of the wall between it and the interior.

The solution for a heated building is FIG. 2. The solution for an air-conditioned building is FIG. 4. But what about the usual case, where the building is heated at various times, and cooled at various other times? One possibility that presents itself (U.S. Pat. No. 5,027,572) is to put vapor barriers on both the inside and outside of the wall. But this does not solve the problem because the dewpoint of the air between the two barriers will be at some value intermediate between the dewpoint of the outside air and the dewpoint of the interior air, depending on the relative amount of leakage on the two sides. If either side of the wall is below this value, condensation will form on that side. Merely placing a vapor barrier on the warm side is not sufficient. It is also necessary that, at the same time that the vapor barrier is blocking humid air on the warm side, any moisture within the wall must be allowed to leave toward the dry side. Otherwise moisture can be trapped between the two vapor barriers, leading to condensation. In other words, the air inside the wall must be the air from the dry side, with its lower dewpoint. During the heating season this is the exterior air, and during the cooling season it is the interior air.

Before the advent of air conditioning, buildings only had to cope with being heated. Any exterior wall that had more ventilation to the exterior than to the interior, whether by design or by accident, was safe from condensation. Most buildings today in temperate zones will be cooled in the summer and heated in the winter, and so will face the quandary described above. Indeed, buildings that are retrofitted with air conditioning commonly develop condensation problems as a result. Buildings that have survived for decades, or even centuries, may be destroyed when air conditioning is installed, by rotting of their structural wood members.

Various other proposals have been made to deal with the problem. US-2003/0205129, US-2004/0211315, and U.S. Pat. No. 6,793,713 propose periodically placing desiccant within the insulation cavity. US-2010/0233460 and US-2010/0229498 propose ventilating an insulating cavity with manually operated valves. US-2007/0094964, US-2007/0084139, and U.S. Pat. No. 7,247,090 describe systems with a dehumidifier that forces dehumidified air into the insulating cavity.

What is needed is an inexpensive insulating system that automatically, throughout all seasons, ventilates to the colder side, while blocking ventilation to the warmer side.

A component, that will be used in the current invention, and that is well known in the art, is a one-way valve that operates with low-pressure differential between inlet and outlet. U.S. Pat. No. 8,464,715 describes one-way valves that are used in non-rebreathing facemasks. US-3993096 describes a one-way valve operated by air pressure, used in air conditioners. U.S. Pat. No. 4,565,214 describes a flapper check valve that is operated by a low-pressure differential. U.S. Pat. No. 6,210,266 describes a flap valve for pressure relief in an automobile passenger compartment.

The requirements for a one-way valve in the current invention are that it be durable, and operate in response to a low-pressure differential between its inlet and outlet. It need not perfectly seal against wrong-way flow, but only restrict wrong-way flow to be significantly lower than right-way flow. It does not need to have a large flow rate, only a flow rate that is larger than whatever leakage exists in the vapor barriers of the current invention.

FIGS. 5, 6, 7, and 8 depict a low-pressure differential one-way valve 500, as is well known in the art. 502 is the inlet, and 501 is the outlet. A lightweight and flexible but strong membrane 504 in the shape of a disc is secured at its periphery 505 to be held above a barrier 506 with inlet holes 507. When inlet 502 pressure is higher than outlet 501 pressure (FIGS. 5 and 6), a flow 503 is established through the inlet holes 507 and out through the outlet 501. The schematic symbol depicting the flow condition is shown in FIG. 6. When inlet 502 pressure is lower than outlet 501 pressure (FIGS. 7 and 8), the membrane 504 presses against the barrier 506, blocking the holes 507 and preventing backflow (703). The schematic symbol depicting the non-flow condition is shown in FIG. 8.

SUMMARY

The air in an insulating cavity is at a temperature intermediate between the temperatures of the interior and exterior of a building. This fact is exploited to induce a chimney effect in the insulating cavity, relative to the colder of the two adjacent temperatures. In the heating season, ventilation takes place between the insulating cavity and the exterior but is blocked between the cavity and the interior, thus replacing any humid air with dry outside air. In the air-conditioning season, ventilation takes place between the insulating cavity and the interior but is blocked between the cavity and the exterior, thus replacing any humid air with dry inside air. In effect, the system obeys the rule of thumb "Put the vapor barrier on the warm side of the wall," in both heating and air-conditioning seasons.

The flows of air are very small, because they only need to be larger than any leakage in the vapor barriers situated on the exterior and interior sides of the cavities. In particular, the flows of air do not cause any significant reduction of the insulating ability of the system.

Four one-way valves regulate the flows. Each valve opens and closes exclusively in response to differential pressure between its inlet and outlet. The system is entirely automatic, requires no human control or regulation, and no external power source other than the temperature differential between the inside and the outside of the building. The only moving parts of the system are the flap membranes inside the one-way valves.

By always ensuring that the air inside the cavity comes from the drier side, condensation is prevented.

DRAWINGS

Figures

FIG. 1 (Prior Art) shows the problem of moisture condensation during a heating season.

FIG. 2 (Prior Art) shows the usual method of preventing moisture condensation during a heating season.

FIG. 3 (Prior Art) shows the problem of moisture condensation during an air-conditioning season.

FIG. 4 (Prior Art) shows the usual method of preventing moisture condensation during an air-conditioning season.

FIG. 5 (Prior Art) shows the usual direction of airflow in a one-way valve.

FIG. 6 (Prior Art) schematically shows the usual direction of airflow in a one-way valve.

FIG. 7 (Prior Art) shows how a one-way valve stops backflow.

FIG. 8 (Prior Art) schematically shows a one-way valve stopping backflow.

Figure 9:
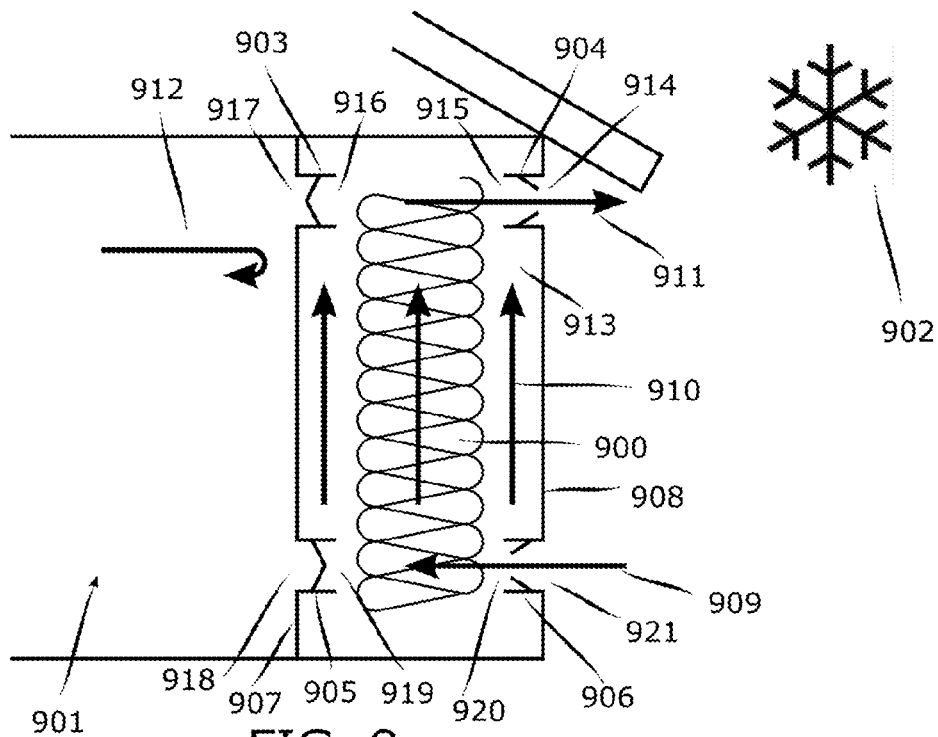

FIG. 9 shows the operation of the current invention in a heating season.

Figure 10:
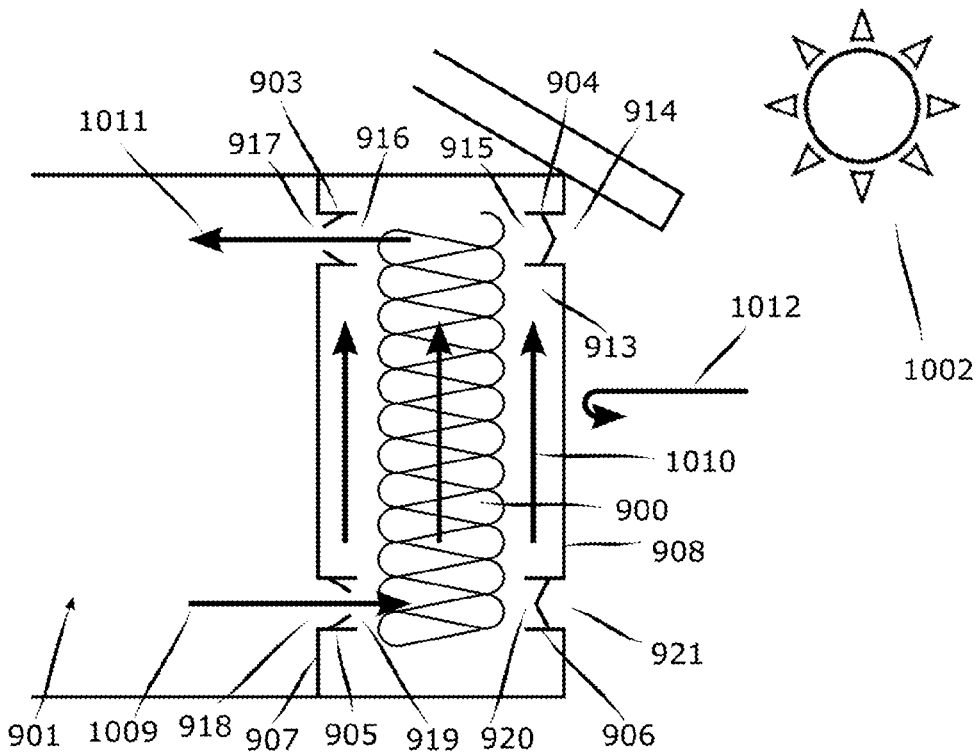

FIG. 10 shows the operation of the current invention in an air-conditioning season.

DRAWINGS

Reference Numerals

100—fill insulation
101—building interior
102—exterior of building in heating season
103—exfiltration of air from interior to exterior
104—condensation where humid air touches material colder than air dewpoint
105—interior wall
106—exterior wall
200—fill insulation
201—building interior
202—exterior of building in heating season
203—exfiltration of air blocked by vapor barrier
204—vapor barrier
205—interior wall
206—exterior wall
300—fill insulation
301—building interior
302—exterior of building in air-conditioning season
303—infiltration of air from exterior to interior
304—condensation where humid air touches material colder than air dewpoint
305—interior wall
306—exterior wall
400—fill insulation
401—building interior
402—exterior of building in air-conditioning season
403—infiltration of air blocked by vapor barrier
404—vapor barrier
405—interior wall
406—exterior wall
500—one-way valve
501—air outlet
502—air inlet
503—airflow
504—membrane
505—membrane securement
506—barrier
507—air holes
703—blocked backflow
900—fill insulation
901—building interior
902—building exterior in heating season
903—upper interior one-way valve
904—upper exterior one-way valve
905—lower interior one-way valve
906—lower exterior one-way valve
907—interior wall with vapor barrier
908—exterior wall with vapor barrier
909—airflow into cavity from exterior
910—airflow within cavity
911—airflow from cavity to exterior
912—blocked airflow between interior and cavity
913—cavity
914—upper exterior one-way valve outlet 915—upper exterior one-way valve inlet
916—upper interior one-way valve inlet
917—upper interior one-way valve outlet
918—lower interior one-way valve inlet
919—lower interior one-way valve outlet
920—lower exterior one-way valve outlet
921—lower exterior one-way valve inlet
1002—building exterior in air-conditioning season
1009—airflow from building interior into cavity
1010—airflow within cavity
1011—airflow from cavity into building interior
1012—blocked airflow between exterior and cavity

DETAILED DESCRIPTION

The function of the building insulation system is to minimize the flow of heat, without allowing condensation to form. FIG. 9 shows the system in operation during a heating season 902, and FIG. 10 shows the system in operation during a cooling season 1002. An insulating cavity 913 is interposed between the interior 901 of a building, and the exterior (FIG. 9 902 or FIG. 10 1002). An optional insulating material 900, such as fiberglass or cellulose, may be interposed between an inner wall 907 and an outer wall 908. Both inner 907 and outer 908 walls are impermeable to gas, including water vapor. Four one-way valves 903, 904, 905, and 906 control all airflow into and out of the cavity.

Situated at the top of the inner wall 907 is an upper interior one-way valve 903 that is configured to allow air 1011 to flow from the cavity 913 to the interior 901, but not in the opposite direction.

Situated at the bottom of the inner wall 907 is a lower interior one-way valve 905 that is configured to allow air 1009 to flow from the interior 901 to the cavity 913, but not in the opposite direction.

Situated at the top of the outer wall 908 is an upper exterior one-way valve 904 that is configured to allow air 911 to flow from the cavity 913 to the exterior 902, but not in the opposite direction.

Situated at the bottom of the outer wall 908 is a lower exterior one-way valve 906 that is configured to allow air 909 to flow from the exterior 902 to the cavity 913, but not in the opposite direction.

When the structure is being heated (FIG. 9), the temperature in the interior of the building is higher than inside the cavity, which in turn is higher than the exterior. Thus a chimney effect is created within the cavity, relative to the exterior: the pressure at the top of the cavity is greater than the exterior pressure at the same height, and the pressure at the bottom of the cavity is less than the exterior pressure at the same height. Thus air flows from the exterior through the lower exterior one-way valve into the cavity, up the cavity, and out the upper exterior one-way valve to the outside. Any moist air inside the cavity is flushed out and replaced by dry exterior air. Meanwhile, because the temperature inside is greater than the temperature in the cavity, a potential chimney effect is created within the interior, relative to the cavity. However no flow of air takes place between the interior and the cavity, because the pressure at top of the interior is greater than the pressure at the same height within the cavity, and the pressure at the bottom of the interior is less than the pressure at the same height within the cavity. Thus the upper interior and lower interior valves block the flow of air between the interior and the cavity.

When the structure is being air-conditioned (FIG. 10), the temperature in the interior of the building is lower than inside the cavity, which in turn is lower than the exterior. Thus a chimney effect is created within the cavity, relative to the interior: the pressure at the top of the cavity is greater than the interior pressure at the same height, and the pressure at the bottom of the cavity is less than the interior pressure at the same height. Thus air flows from the interior through the lower interior one-way valve into the cavity, up the cavity, and out the upper interior one-way valve to the interior. Any moist air inside the cavity is flushed out and replaced by dry interior air. Meanwhile, because the temperature in the exterior is greater than the temperature in the cavity, a potential chimney effect is created within the exterior, relative to the cavity. However no flow of air takes place between the exterior and the cavity, because the pressure at top of the exterior is greater than the pressure at the same height within the cavity, and the pressure at the bottom of the exterior is less than the pressure at the same height within the cavity. Thus the upper exterior and lower exterior valves block the flow of air between the interior and the cavity.

We see, then, that the system obeys the rule "Put a vapor barrier on the warm side of the wall," in both heating and cooling seasons, while allowing the wall to dry out to the drier colder side. The air inside the wall cavity is always the air of the colder and drier side and thus has its lower dewpoint. Condensation is prevented during all seasons.

What is claimed is:

1. A non-condensing all-season insulation system for a building, comprising:
    an interior vapor barrier;
    an exterior vapor barrier;
    an intermediate air space;
    a lower-interior one-way valve comprising an inlet and an outlet;
    an upper-interior one-way valve comprising an inlet and an outlet;
    a lower-exterior one-way valve comprising an inlet and an outlet;
    an upper-exterior one-way valve comprising an inlet and an outlet;
    wherein
       the interior vapor barrier is situated between the intermediate air space and an interior of the building;
       the exterior vapor barrier is situated between the intermediate air space and an exterior of the building;
    the inlet of the lower-interior one-way valve is connected to the interior of the building;
    the inlet of the upper-interior one-way valve is connected to the intermediate air space;
    the inlet of the lower-exterior one-way valve is connected to the exterior of the building;
    the inlet of the upper-exterior one-way valve is connected to the intermediate air space;
    the outlet of the lower-interior one-way valve is connected to the intermediate air space;
    the outlet of the upper-interior one-way valve is connected to the interior of the building;
    the outlet of the lower-exterior one-way valve is connected to the intermediate air space;
    the outlet of the upper-exterior one-way valve is connected to the exterior of the building;
    the lower-interior one-way valve is internally configured to allow airflow from the interior of the building to the intermediate air space when and only when air pressure of the interior of the building at the inlet of the lower-interior one-way valve is higher than air pressure of the intermediate air space at the outlet of the lower-interior one-way valve, but to prevent airflow from the intermediate air space to the interior of the building;

the upper-interior one-way valve is internally configured to allow airflow from the intermediate air space to the interior of the building when and only when air pressure of the intermediate air space at the inlet of the upper-interior one-way valve is higher than air pressure of the interior of the building at the outlet of the upper-interior one-way valve, but to prevent airflow from the interior of the building to the intermediate air space;

the lower-exterior one-way valve is internally configured to allow airflow from the exterior of the building to the intermediate air space when and only when air pressure of the exterior of the building at the inlet of the lower-exterior one-way valve is higher than air pressure of the intermediate air space at the outlet of the lower-exterior one-way valve, but to prevent airflow from the intermediate air space to the exterior of the building;

the upper-exterior one-way valve is internally configured to allow airflow from the intermediate air space to the exterior of the building when and only when air pressure of the intermediate air space at the inlet of the upper-exterior one-way valve is higher than air pressure of the exterior of the building at the outlet of the upper-exterior one-way valve, but to prevent airflow from the exterior of the building to the intermediate air space;

the lower-interior one-way valve is situated at a lower height than the upper-interior one-way valve;

the lower-exterior one-way valve is situated at a lower height than the upper-exterior one-way valve;

the non-condensing all-season insulation system is configured to allow airflow between the intermediate air space and the exterior of the building but block airflow between the intermediate air space and the interior of the building, when the building is heated;

the non-condensing all-season insulation system is configured to allow airflow between the intermediate air space and the interior of the building but block airflow between the intermediate air space and the exterior of the building, when the building is cooled;

the lower-interior one-way valve, the upper-interior one-way valve, the lower-exterior one-way valve, and the upper-exterior one-way valve are configured to limit airflow to avoid reducing an insulating ability of the non-condensing all-season insulation system.

2. The non-condensing all-season insulation system of claim 1, further comprising an insulation layer situated within the intermediate air space.

* * * * *